UNITED STATES PATENT OFFICE.

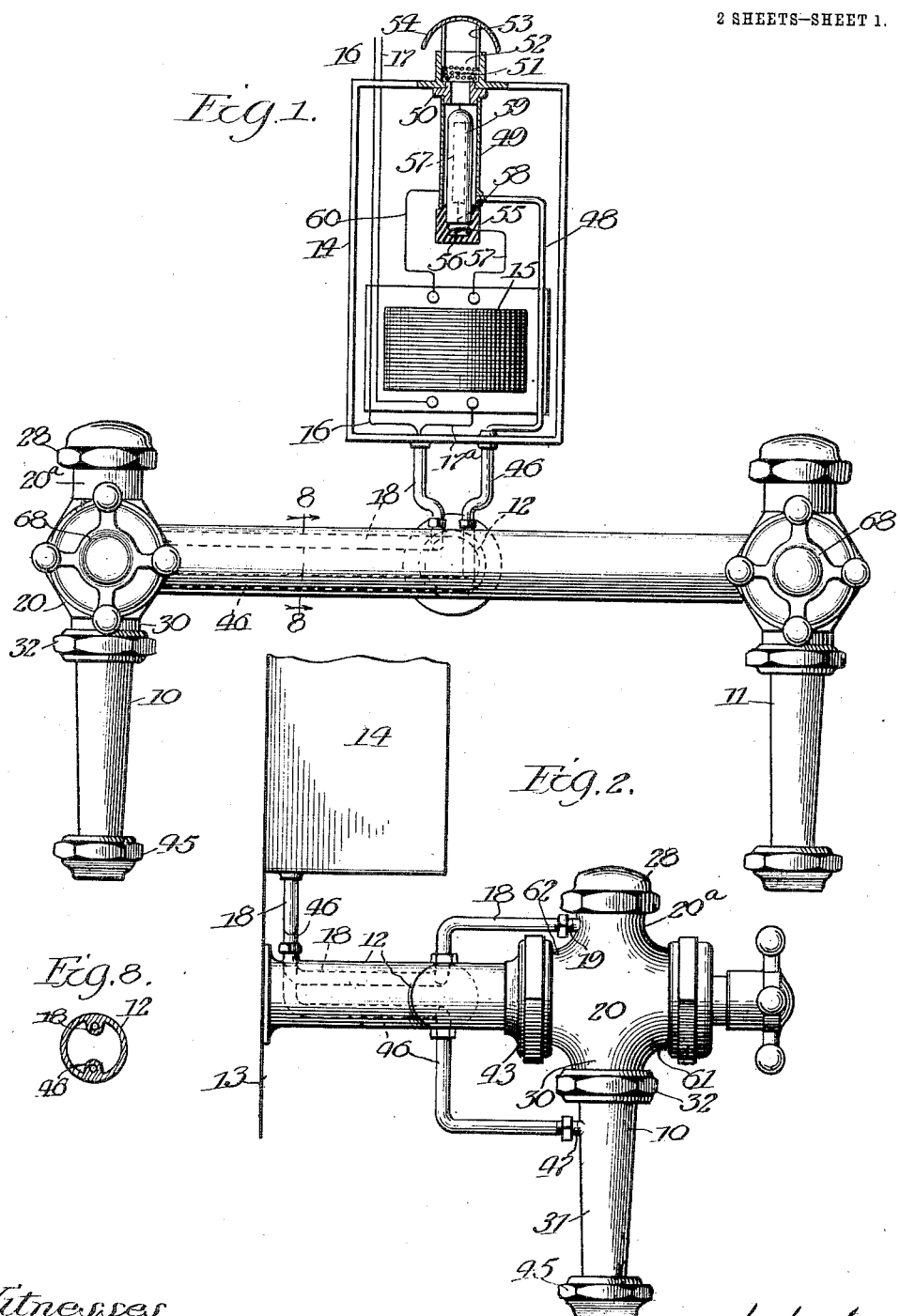

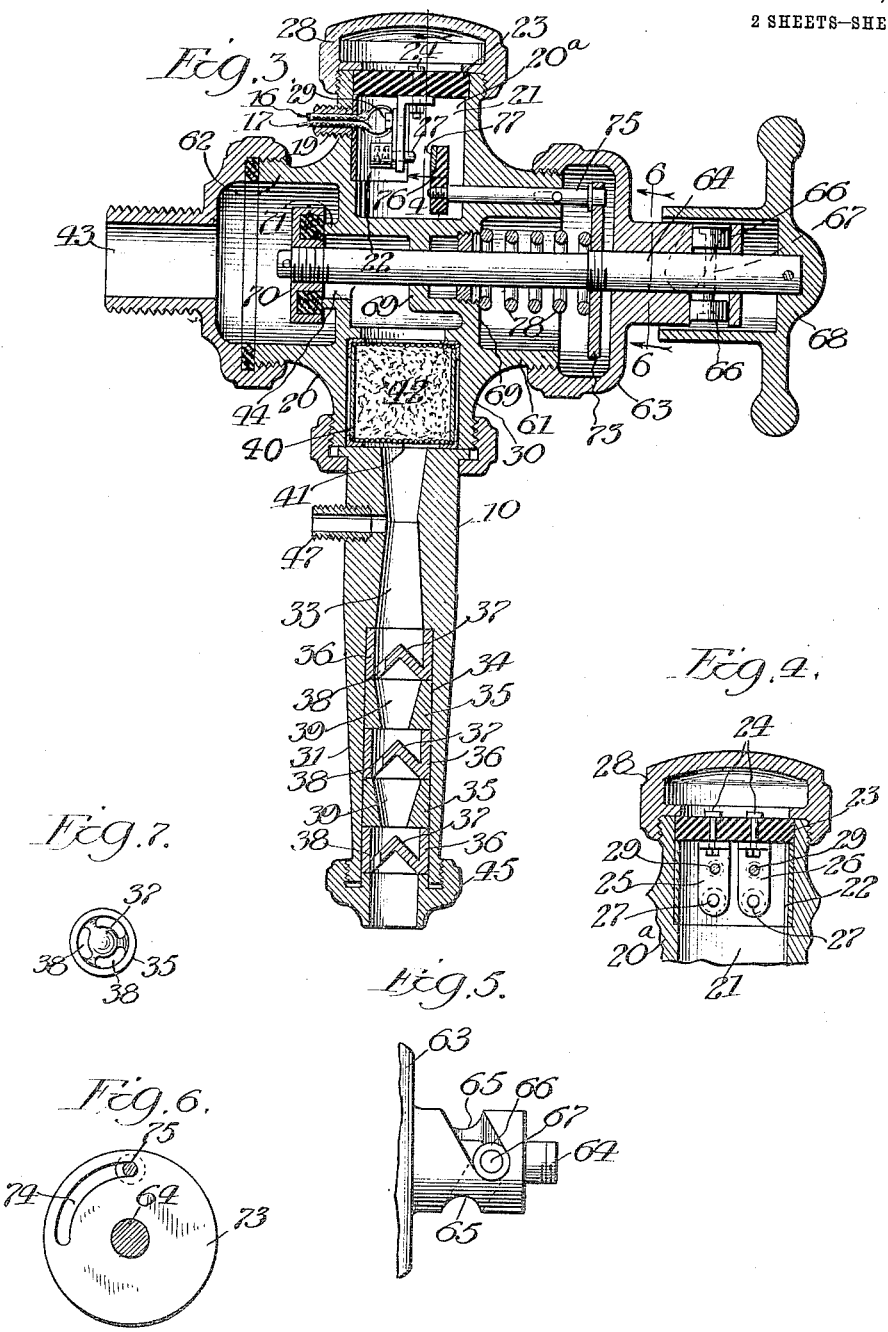

SIEGFRIED HELD, OF CHICAGO, ILLINOIS.

APPARATUS FOR STERILIZING WATER.

1,044,653.  Specification of Letters Patent.  Patented Nov. 19, 1912.

Application filed March 16, 1912. Serial No. 684,323.

*To all whom it may concern:*

Be it known that I, SIEGFRIED HELD, a subject of the Emperor of Austria-Hungary, residing at Chicago, in the county of Cook and State of Illinois, have invented certain new and useful Improvements in an Apparatus for Sterilizing Water, of which the following is a specification.

This invention relates to improvements in an apparatus for purifying and sterilizing water, the latter act being performed by ozonization, and it consists in certain peculiarities of the construction, novel arrangement, and operation of the various parts thereof, as will be hereinafter more fully set forth and specifically claimed.

The principal object of the invention, is to provide an apparatus of the above named general character, which shall be simple and inexpensive in construction, strong, durable, and easy and effective in operation.

Other objects will more fully appear from the consideration of the embodiment of the invention set forth in the following specification and accompanying drawings, in which—

Figure 1, is a front view partly in elevation and partly in section of an apparatus for sterilizing water embodying the invention, but showing the front plate of the casing for the ozone producer removed. Fig. 2, is a side view of a portion of the apparatus. Fig. 3, is an enlarged vertical central sectional view of one of the faucets of the device. Fig. 4, is a vertical sectional view taken on line 4—4, of Fig. 3, looking in the direction indicated by the arrows, of the upper portion of said faucet. Fig. 5, is a plan view of a portion of the cam grooved coupling or bearing for the handled valve-stem of said faucet. Fig. 6, is a sectional view taken on line 6—6, of Fig. 3, looking in the direction indicated by the arrows, showing a portion of the means for completing the electric circuit for the purpose of charging water with ozone when the water is discharged through the faucet. Fig. 7, is a detached plan view of one of the agitating or mixing plugs of the faucet, and Fig. 8, is a cross sectional view taken on line 8—8, of Fig. 1, looking in the direction indicated by the arrows.

Like numerals of reference refer to corresponding parts throughout the different views of the drawings.

In the present instance, the apparatus is shown as consisting of two vertically disposed faucets, each of which is designated as a whole by the reference numerals 10, and 11, which are united together by, and have communication with a pipe for the supply of water, not shown, through a T-coupling 12, which coupling, and water supply may be mounted on a suitable support such as a wall 13, at a convenient height, or over a sink or basin. Mounted on the wall or support 13, above the coupling 12, is a box like casing 14, in which is mounted a transformer 15, of the ordinary or any preferred construction which is electrically connected, by means of suitable conductors 16, 17, and 17$^a$, with a source of electric supply, not shown. Leading from the lower portion of the casing 14, to and through the coupling 12, is a pipe 18, which communicates at its other end through the medium of a nipple 19, with the upper portion of the faucet 10, which will be termed the sterilizing faucet. The body 20, of this faucet is provided in its upper portion with an upward extension 20$^a$, having a cavity 21, in a recess in the wall of which is located a shield 22, of fiber or other suitable insulating material and said cavity has fitted in its upper portion a plug 23, of fiber or other insulating material which plug has secured to its lower surface by means of bolts 24, a pair of depending brackets 25, and 26, each of which is provided at its lower portion with a contact point 27. The upper end of the extension 20$^a$, may be closed by a screw cap 28, if desired.

At the inner end of the nipple 19, the shield 22, of insulating material, is provided with an opening to register with the opening in said nipple and is for the reception of the conductors 16, and 17$^a$, which are extended through the tube or pipe 18, and said nipple into the cavity 21, and are connected at one of their ends to binding posts 29, on the brackets 25, and 26, as will be readily understood by reference to Fig. 4, of the drawings. The opposite end of the conductor 17$^a$, is suitably connected to the transformer 15, while the lower end of the conductor 17, is also connected to said transformer. Extended downwardly from the body 20, of the sterilizing faucet 10, and opposite the extension 20$^a$, thereof, is another hollow extension 30, to which the discharge nozzle 31, of said faucet may be connected by means of a suitable coupling 32, which is preferably swiveled on the upper portion of the nozzle 31, and is in screw engagement with the extension 30, of the body of the faucet. The discharge nozzle 31, is provided with a bore 33, which communicates at its upper end with the cavity of the extension 30, and has its lower portion enlarged as at 34, to receive a number of apertured plugs 35, and 36, the latter of which are each provided with an upwardly extended conical partition 37, each of which is furnished with a series of openings 38, for the passage of water. Each of the plugs 35, which are alternately located in the enlargement 34, of the bore 33, of the nozzle 31, with respect to the plugs 36, is provided with a downwardly tapered opening 39, which will direct the liquid toward the apices of the partitions 37, and at the same time will slightly compress the volume of water or liquid so that when it passes through said openings 39, on to the tapered partitions 37, it will be divided thus permitting it to be impregnated with the ozonized air, introduced to the nozzle 31, as will be presently explained. Located in the cavity of the extension 30, is a casing 40, which is provided at its upper and lower ends with sieves or strainers 41, and is filled with filtering material 42, of any suitable kind through which the water will pass in its way from the supply pipe coupling 43, through the passageway 44, and out through the orifice of the nozzle 31, which may have fitted on its lower portion a cap 45, to hold the plugs 35, and 36, in position. Communicating with the lower portion of the casing 14, and extended into and through the T-coupling 12, is a tube or pipe 46, which is connected to the nozzle 31, and in communication with the bore 33, thereof, by means of a nipple 47, which is secured in a suitable opening in said nozzle. Leading from the upper portion of the tube 46, is a pipe or tube 48, which extends upwardly in the casing 14, and communicates at its upper end with a drum or shell 49, of metal, which shell or drum constitutes one of the electrodes of the ozone producer, and is secured at its upper end to the lower portion of an apertured plug 50, which is secured in an opening in the upper part of the casing 14, around which opening is provided an upwardly projected tubular extension 51, for the admission of air to the drum or shell 49. The extension 51, is preferably provided with air filtering means 52, and preferably has mounted thereabove on uprights 53, a hood or canopy 54, to shield the opening of the tube 51, from falling particles. Mounted on the lower end of the drum or shell 49, is a socketed piece 55, of fiber or insulation, which has fitted in the lower portion of its socket a metal piece 56, to which one end of an electric conductor 57, is connected, the other end of which is suitably connected to the transformer. Closely fitted at its lower end in the upper portion of the socket of the piece 55, is a glass bulb or vacuum tube 57, which extends upwardly in the drum 49, to near the plug 50, and has its upper portion tapered as shown in Fig. 1, of the drawings. This vacuum tube or bulb 57, is spaced from the drum or electrode 49, as shown, and has mounted within the same on a stem 58, which contacts with the metal piece 56, another electrode 59, which is held at a distance from the tube or bulb 57, in any suitable manner. Connected at one of its ends to the drum or electrode 49, is an electric conductor 60, which is connected at its other end to the transformer.

The body 20, of the sterilizing faucet 10, is provided with a hollow neck or extension 61, located directly opposite the hollow extension 62, thereof, to which latter extension the coupling 43, which unites said faucet to the T-coupling 12, is secured. Secured on the extension 61, is a coupling 63, which has a central opening for the valve stem 64, of the faucet, and is provided in its outer portion with a pair of cam slots 65, (see Fig. 5) which slots are diagonally disposed in opposite directions on the extension 63, and are for the reception and operation of rollers 66, one of which is journaled on each end of a rod 67, which is transversely extended through the valve stem 64, near its outer end. The outer end of the valve stem 64, has fixed thereon a hand wheel or handle 68, used for turning said stem in the operation of opening the valve of the faucet. As is clearly shown in Fig. 3, the body 20, of the faucet is provided between the extensions 61, and 62, with an apertured partition 69, through which opening the valve stem 64, is extended, said stem having on its inner end or portion a valve 70, which normally rests against the valve seat 71, with which the way 44, is provided at its rear end. Located on the valve stem 64, within the cavity of the coupling 63, is a disk 73, which is provided with a segmental slot 74, near its periphery for the operation of a rod 75, which is movably secured in a suitable opening in the extension 61, and projects at its inner end into the cavity 21, of the upper extension 20ª, of the sterilizing faucet. Mounted on the inner end of the rod 75, is a piece of fiber 76, which has mounted thereon a metal plate 77, to contact with the contact points 27, on the brackets 25, and 26, to which the electric conductors 16, and 17ª, are connected. Surrounding the valve stem 64, is a coiled spring 78, which rests at one of its ends against the disk 73, and at its other end against the partition 69, of the faucet body. The faucet 11, may be of the ordinary or any preferred construction, and is intended to be used for the discharge of water for culinary purposes which it is not necessary to purify or sterilize, and if desired, said faucet and the portion of the T-coupling 12, to which it is connected may be omitted without detracting from the merits of the invention.

From the foregoing and by reference to the drawings, it will be readily understood and clearly seen, that by turning the handle 68, on the valve stem 64, the latter will be advanced or forced inwardly by reason of the action of the rollers 66, in the grooves 65, of the coupling 63, so that the valve 70, will be removed from its seat 71, thus allowing water to pass through the way 44, and from thence through the filtering material 42, and from thence out through the discharging nozzle 31, of the sterilizing faucet. As the valve stem is thus advanced it is evident that the rod 75, will also be moved rearwardly so that the contact plate 77, will be brought into contact with the points 27, thus completing the electric circuit between the conductors 16, and 17ª, and between the conductors 57, and 60, thereby causing the air, by reason of the suction produced by the discharge of water through the nozzle 31, to be drawn through the extension 51, drum or shell 49, and pipes 48, and 46, to be ozonized in its passage. As the water passes downwardly through the nozzle 31, it is evident that its volume will be broken up by reason of the cone-shaped partitions or projections 37, thus allowing the ozonized air to thoroughly commingle therewith.

Having thus fully described my invention what I claim as new and desire to secure by Letters-Patent is—

1. A faucet, for sterilizing water and other liquids by means of ozonized air, and having communication with a supply of liquid, a valve stem movably mounted in the faucet, a valve on said stem to open and close the passageway for the liquid in said faucet, a rod movably mounted in the faucet and loosely connected at one of its ends to the valve stem, a contact bar mounted on the other end of said rod and insulated therefrom, contact points located within the faucet in the path of the bar, current conductors connected to said contact points and leading to a means for generating ozone, and means for delivering ozonized air to said faucet.

2. A faucet for sterilizing water by means of ozonized air, and having communication with a water supply system, current conductors connected to a means for producing ozone and entering into a chamber formed within the upper portion of the faucet, contact points arranged within said chamber and electrically connected to the current conductors, a spring pressed valve stem movably mounted in the faucet, a valve on said stem to open and close the passageway for the liquid through the faucet, a rod movably mounted in the faucet and connected at one of its ends to the valve stem, a contact bar on the other end of said rod and insulated therefrom, a conduit for conveying ozonized air to the faucet, and means for reciprocating the aforementioned valve stem.

3. A sterilizing faucet having communication with a supply of liquid, a discharging nozzle for said liquid, a conduit connected to the nozzle for delivering ozonized air thereto from an ozonizer, current conductors leading from the ozonizer and extending into the upper portion of the faucet, a series of apertured plugs located in the bore of said discharging nozzle, said plugs alternately having an upwardly extending conical shaped apertured partition and a downwardly tapered central opening, a reciprocating valve stem movably mounted in the faucet, a valve on said stem to open and close the passageway for the liquid, in said faucet, a rod movably mounted in the faucet and loosely connected at one of its ends to the valve stem, a contact plate fixed on the other end of said rod and insulated therefrom, contact points arranged within the faucet in the path of said contact plate, and electrically connected to the above mentioned current conductors, and means to reciprocate said valve stem.

4. A sterilizing faucet having communication with a supply of liquid, a discharging nozzle for said liquid, a conduit connected to the nozzle for delivering ozonized air thereto from an ozonizer, current conductors leading from the ozonizer and extending into the upper portion of the faucet, a series of apertured plugs located in the bore of said nozzle, at least one of said plugs having an upwardly extending conical shaped apertured partition, a valve stem mounted for reciprocal and rotary movement in the faucet, a valve on said stem to open and close the passageway for the liquid in said faucet, a plate fixed on said valve stem and having a segmental slot near its periphery, a rod slidably mounted in the faucet and loosely fitted at one of its ends in the slot in said plate, a contact plate mounted on the other end of said rod and insulated therefrom, contact points arranged within a chamber formed in the upper portion of the faucet in the path of the contact plate and being electrically connected to the current conductors, means on the valve stem to reciprocate the same in one direction, and a spring for returning the same.

5. In an apparatus of the character described, a pipe having communication with a water supply system and provided on its inner surface with tubes or conduits formed integrally therewith and extended at their ends through the walls of said pipe, a sterilizing faucet communicatively connected to said pipe and to said tubes or conduits, at one of their ends, and means communicatively connecting the other ends of said tubes or conduits to an ozonizer.

6. In an apparatus of the character described, a faucet including a body having a passageway therethrough for liquid, a valve to open and close said passageway, a discharging nozzle having communication with the cavity of the body of the faucet and detachably connected thereto and provided with an enlargement of its bore at its lower portion, water filtering means removably located at the upper portion of said nozzle, a series of apertured plugs located in the enlargement of the cavity of said nozzle, said plugs alternately having an upwardly extended conical shaped apertured partition and a downwardly tapered central opening, and means on the lower end of the nozzle to retain said plugs therein.

SIEGFRIED HELD.

Witnesses:
CHAS. C. TILLMAN,
E. NEWSTROM.